US008731281B2

(12) United States Patent
Dong et al.

(10) Patent No.: US 8,731,281 B2
(45) Date of Patent: May 20, 2014

(54) WAVELET TRANSFORM ON INCOMPLETE IMAGE DATA AND ITS APPLICATIONS IN IMAGE PROCESSING

(75) Inventors: Xiaogang Dong, Germantown, MD (US); Farhan Baqai, Fremont, CA (US); Kenichi Nishio, Yokohama (JP)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 13/065,729

(22) Filed: Mar. 29, 2011

(65) Prior Publication Data

US 2012/0250976 A1  Oct. 4, 2012

(51) Int. Cl.
*G06K 9/00* (2006.01)

(52) U.S. Cl.
USPC .......................................... 382/162; 382/154

(58) Field of Classification Search
USPC .................................. 382/154, 162
See application file for complete search history.

(56) References Cited

U.S. PATENT DOCUMENTS

| | | | | |
|---|---|---|---|---|
| 3,971,065 | A * | 7/1976 | Bayer | 348/276 |
| 7,489,346 | B2 * | 2/2009 | Mizukura et al. | 348/223.1 |
| 8,014,597 | B1 * | 9/2011 | Newman | 382/166 |
| 8,532,373 | B2 * | 9/2013 | Hong | 382/162 |
| 2003/0152275 | A1 * | 8/2003 | Chung et al. | 382/218 |
| 2006/0013314 | A1 * | 1/2006 | Vella et al. | 375/240.22 |
| 2006/0279585 | A1 * | 12/2006 | Milanfar et al. | 345/694 |
| 2007/0206852 | A1 * | 9/2007 | McGee | 382/166 |
| 2010/0085452 | A1 * | 4/2010 | Hirakawa et al. | 348/273 |
| 2010/0104158 | A1 * | 4/2010 | Shechtman et al. | 382/131 |
| 2011/0075935 | A1 * | 3/2011 | Baqai et al. | 382/195 |
| 2011/0149110 | A1 * | 6/2011 | Sugiyama | 348/223.1 |
| 2011/0150411 | A1 * | 6/2011 | Sugiyama | 386/224 |
| 2011/0286514 | A1 * | 11/2011 | Newman | 375/240.2 |
| 2012/0207396 | A1 * | 8/2012 | Dong et al. | 382/218 |
| 2012/0250976 | A1 * | 10/2012 | Dong et al. | 382/154 |
| 2013/0129211 | A1 * | 5/2013 | Newman | 382/166 |

FOREIGN PATENT DOCUMENTS

| | | |
|---|---|---|
| JP | 2003-125209 A * | 4/2003 |
| WO | WO 2008067479 A1 * | 6/2008 |
| WO | WO 2010/010349 A1 | 1/2010 |

OTHER PUBLICATIONS

Xiao-Yue Jiang, Rong-chun Zhao, "Texture Segmentation Based on Incomplete Wavelet Packet Frame", Proceedings of the Second International Conference on Machine Learning and Cybernetics, Xi'an, Nov. 25, 2003, p. 3172-3177.*

(Continued)

*Primary Examiner* — Gandhi Thirugnanam
(74) *Attorney, Agent, or Firm* — Gregory J. Koerner; Redwood Patent Law (57) ABSTRACT

A system and method for effectively performing wavelet transforms on incomplete image data includes an image processor that performs a green-pixel transformation procedure on incomplete color pixel matrices. The image processor then rearranges red, blue and transformed green-pixel into four quadrants of contiguous pixels and applies some two dimensional (2D) wavelet thresholding schemes on each quadrant. After thresholding, an inverse procedure is applied to reconstruct the pixel values on the incomplete color pixel matrices. For further de-correlation of image data, the image processor may stack similar image patches in a three dimensional (3D) array and apply incomplete-data wavelet thresholding on the 3D array. The incomplete-data wavelet thresholding procedure may be put in an improved local similarity measurement framework to achieve better performance of image processing tasks. A CPU device typically controls the image processor to effectively perform the image processing procedure.

20 Claims, 11 Drawing Sheets

(56) References Cited

OTHER PUBLICATIONS

Eli Shechtman, Michal Irani, Matching Local Self-Similarities Across Images and Videos, http://www.wisdom.weizmann.ac.il/~vision/VideoAnalysis/Demos/SelfSimilarities/SelfSimilarities_ShechtmanIrani07.pdf, Jul. 16, 2007, Minneapolis, MN, p. 1-8.

Qin LV, Moses Charikar, Kai Li, Image Similarity Search With Compact Data Structures, http://www.cs.princeton.edu/cass/papers/LCL04.pdf, Department of Computer Science Princeton University, 2004, p. 1-10.

* cited by examiner

WAVELET TRANSFORM ON INCOMPLETE IMAGE DATA AND ITS APPLICATIONS IN IMAGE PROCESSING

BACKGROUND SECTION

1. Field of the Invention

This invention relates generally to techniques for processing image data, and relates more particularly to a system and method for effectively performing wavelet transform on incomplete data and applying it in image processing tasks.

2. Description of the Background Art

Wavelet transform is a representation of signal as a weighted sum of some orthonormal basis functions that is called wavelet basis. The corresponding weights are called wavelet coefficients. Haar and Daubechies are among the most frequently used wavelet bases. Wavelet transform has a property to de-correlate image signals, i.e., most of wavelet coefficients obtained are zeros or near zero. Given such a nice property, wavelet transforms are often used in various image processing tasks including, but not limited to, compression, denoising, and demosaicing. More detailed information describing wavelet transform and various techniques for performing wavelet transform procedures may be found in "A Wavelet Tour Of Signal Processing" by S. Mallat, published by Academic Press, 1999.

In many image processing tasks, image data may be incomplete. In other words, there are some missing values on certain pixel locations. For example, a full color image sensor is usually overlaid with a color filter array (CFA). In a CFA, only one color per pixel is measured. There are several different configurations of CFA. The most popular CFA is the Bayer pattern as described by B. E. Bayer in "Color Imaging Array", U.S. Pat. No. 3,971,065, Jul. 20, 1976. It consists of three colors: red, green, and blue. Among all pixels, there are 25% red, 50% green, and 25% blue pixels. In order to improve color reproduction accuracy, T. Mizukura et al. proposed a four-color CFA in "Image pick-up device and image pick-up method adapted with image pick-up sensitivity", U.S. Pat. No. 7,489,346, Feb. 10, 2009. Yoshihara et al. proposed to arrange the Bayer colors in a zigzag arrangement instead of a rectangular array, which improves fill factor and pixel sensitivity as described in "A 1/1.8-inch 6.4 MPixel 60 frames/s CMOS Image Sensor With Seamless Mode Change", IEEE J. Solid-State Circuits, Vol. 41, No. 12, December 2006, pp. 2998-3006.

Demosaicing is a digital image process to reconstruct a full color image from the incomplete color samples output from an image sensor overlaid with a CFA. However, such reconstruction procedure provides only estimates of missing color values at certain pixel locations. The estimated values are usually different from the true color values supposed to be recorded. Such errors will propagate if we perform image processing tasks on the full color images reconstructed by domasaicing. Therefore, there is inherent advantage for performing various image processing techniques including wavelet transform directly on incomplete image data such as the output of an image sensor overlaid with a CFA. In order to perform wavelet transforms on incomplete data, a specially designed wavelet transform is needed since original wavelet transforms are based on the assumption of complete image data.

On the other hand, measuring local image similarity is another important problem in image processing. A better local image similarity measurement would improve the performance of many image processing tasks including, but not limited to, compression, denoising, and demosaicing. Image similarity can be categorized into 3 classes: 1) Low level similarity. Local image patches are considered to be similar if some distance metric (e.g. p-norm, EarthMovers, Mahalanobis) is less than a given threshold; 2) Mid-level similarity. Here local image patches share some simple semantic property; and 3) High-level similarity. In this case, similarity is primarily defined by semantics. Properties that make two patches similar are not visual but they can be inferred from visual information such as a gesture. More detailed information may be found in "Learning Task-Specific Similarity, PhD Thesis," by Greg Shakhnarovich, Department of Electrical Engineering and Computer Science, Massachusetts Institute of Technology, 2005.

One important part of local image similarity measurement is to select an appropriate similarity metric. There are many existing metrics for low-level image similarity in the literature. For instance, one quite popular metric is based on Euclidean distance (L2 norm) between pixels as described by C. Tomasi and R. Manduchi in "Bilateral Filtering for Gray and Color Images," Proc. of IEEE International Conference on Computer Vision, pp. 841-846, 1998. However, this metric is very sensitive to lighting conditions and noise. More robust patch-based Euclidean distances have been proposed in "Self-similarity driven color demosaicing," by A. Buades, IEEE TIP, Vol. 18, No. 6, June 2009, pp. 1192-1202. F. Baqai et al. proposed patch-based L1 distances to measure local image similarity in "A Method to Measure Local Image Similarity Based on the L1 Distance Measure", U.S. patent application Ser. No. 12/567,454, filed on Sep. 25, 2009.

Another critical part of the local image similarity measure is the threshold at which a pixel or an image patch is considered to be similar. The selection of a threshold is based on various factors such an estimate of the degree of degradation in the image, similarity criterion, distance metric (L1, L2, and others), and patch size. F. Baqai et al. utilize a relationship between distances measures to estimate appropriate thresholds in "A Method to Measure Local Image Similarity Based on the L1 Distance Measure", cited above. Such a threshold can be represented as a product of the standard error sigma of local image intensities and a constant t that is not related to sigma and determined by some factors, but not limited to, such as patch sizes and pixel-similarity rates.

Note that standard error sigma of local image intensities is unknown and has to be estimated from image data. Such estimations are generally not perfect. To achieve a better similarity measurement, X. Dong et al. propose an improved procedure in "An Improved Method To Measure Local Image Similarity And Its Application In Image Processing", U.S. patent application Ser. No. 12/931,962, filed on Feb. 15, 2011. The procedure selects one target image patch a time and calculates an intermediate result for the selected target patch. After processing all possible target patches, it then utilizes an intermediate result combining techniques to achieve better final results. A rotated storage technique is also used to improve the memory efficiency of the procedure.

As previously discussed, a specially designed wavelet transform on incomplete data such as output of a full color image sensor overlaid with CFA has inherent advantage in many image processing tasks since it avoids the estimation errors from demosaicing process. Adopting such specially designed wavelet transforms in an improved local image similarity measurement procedure will further improve the performance of many image processing tasks.

SUMMARY

In accordance with the present invention, a two dimensional (2D) wavelet transform is specially designed for incomplete image data including, but not limited to, the output of a full color image sensor overlaid with a color filter array (CFA). In accordance with one embodiment of the present invention, the image processor deals with the Bayer pattern. It performs a green-pixel transformation procedure by performing a 1-level wavelet transform procedure on adjacent diagonal pairs of green pixels in a color pixel matrix. The green pixels in the color pixel matrix are thereby converted by the 1-level wavelet transform procedure into corresponding A terms and D terms of transformed green pixel pairs.

The image processor then rearranges the A terms into A quadrant of contiguous pixels, and similarly rearranges the D terms into D quadrant of contiguous pixels. The image processor also rearranges the blue pixels into blue (B) quadrant of contiguous pixels, and similarly rearranges the red pixels into red (R) quadrant of contiguous pixels. The image processor may then position the R quadrant, the B quadrant, the A quadrant, and the D quadrant to form a respective four-quadrant array. After the whole rearrangement process, the image processor may apply known or enhanced 2D wavelet transform on each quadrant of contiguous pixels separately.

The image processor or other appropriate entity may then perform some wavelet coefficients thresholding scheme on each quadrant of the four-quadrant array. The choice of thresholding scheme depends on specific image processing tasks. After thresholding, the image processor performs an inverse transform of the above described 2D incomplete-data wavelet transform. The details are described as follows: the image processor may perform the corresponding 2D inverse wavelet transform on the R, B, A, and D quadrant of contiguous pixels. The image processor may next perform an inverse 1-level wavelet transform on the A terms and D terms in the A quadrant and the D quadrant to produce reconstructed green pixels. Finally, the image processor reassembles the reconstructed red, green, and blue pixels into the interleaved configurations of the original image patches.

In certain embodiments of the present invention, for further de-correlation of images, similar image patches may be put a three dimensional (3D) array. The image processor first performs the 2D incomplete-data wavelet transform on each image patch in the 3D array to obtain the first wavelet coefficients of each image patch. The image processor then performs one dimensional (1D) wavelet transform on the sets of first wavelet coefficients that share the same pixel location in different image patches in the 3D array to obtain the second wavelet coefficients. The image processor may next perform some thresholding scheme on the second wavelet coefficients. The choice of thresholding scheme may depend on specific image processing tasks. After thresholding, the image processor performs the corresponding 1D inverse wavelet transform to reconstruct the first wavelet coefficients. The image processor then performs the 2D incomplete-data inverse wavelet transform to reconstruct the pixel values of image patches in the 3D array.

In certain embodiments of present invention, in order to achieve better image processing performance, the above described incomplete-data wavelet thresholding scheme may be adopted in the improved local image similarity measurement procedure described in "An improved method to measure local image similarity and its application in image processing", cited previously. The image processor selects a target image patch from some incomplete image data. The image processor then searches similar patches for the target patch and put the predefined number of most similar patches in a 3D array. The image processor next performs the above described incomplete-data wavelet thresholding scheme to the 3D array and store the reconstructed pixel values in an intermediate-result buffer.

The image processor then determines whether any possible target patches remain that have not been subject to the above described incomplete-data wavelet thresholding procedure. If additional target patches remain, then image processor moves to a new current target patch, and derives a new set of intermediate result values in a similar manner for storage in the intermediate results buffer. After all possible target patches have had intermediate result values calculated and stored, the image processor may then perform an intermediate-results combination procedure to produce corresponding processed pixels for the entire image. For all of the foregoing reasons, the present invention therefore provides an improved system and method for effectively performing an image processing with an electronic device.

DETAILED DESCRIPTION

The present invention relates to an improvement in image processing systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing wavelet transform on incomplete image data and applying it to enhanced image processing procedure with an electronic device, and may include an image processor that performs a green-pixel transformation procedure on incomplete color pixel matrices. The image processor then rearranges red, blue and transformed green-pixel into four quadrants of contiguous pixels and applies some two dimensional (2D) wavelet thresholding schemes on each quadrant. After thresholding, an inverse procedure is applied to reconstruct the pixel values on the incomplete color pixel matrices. For further de-correlation of image data, the image processor may stack similar image patches in a three dimensional (3D) array and apply incomplete-data wavelet thresholding on the 3D array. The incomplete-data wavelet thresholding procedure may be put in an improved local similarity measurement framework to achieve better performance of image processing tasks. A CPU device typically controls the image processor to effectively perform the image processing procedure.

Figure 1:
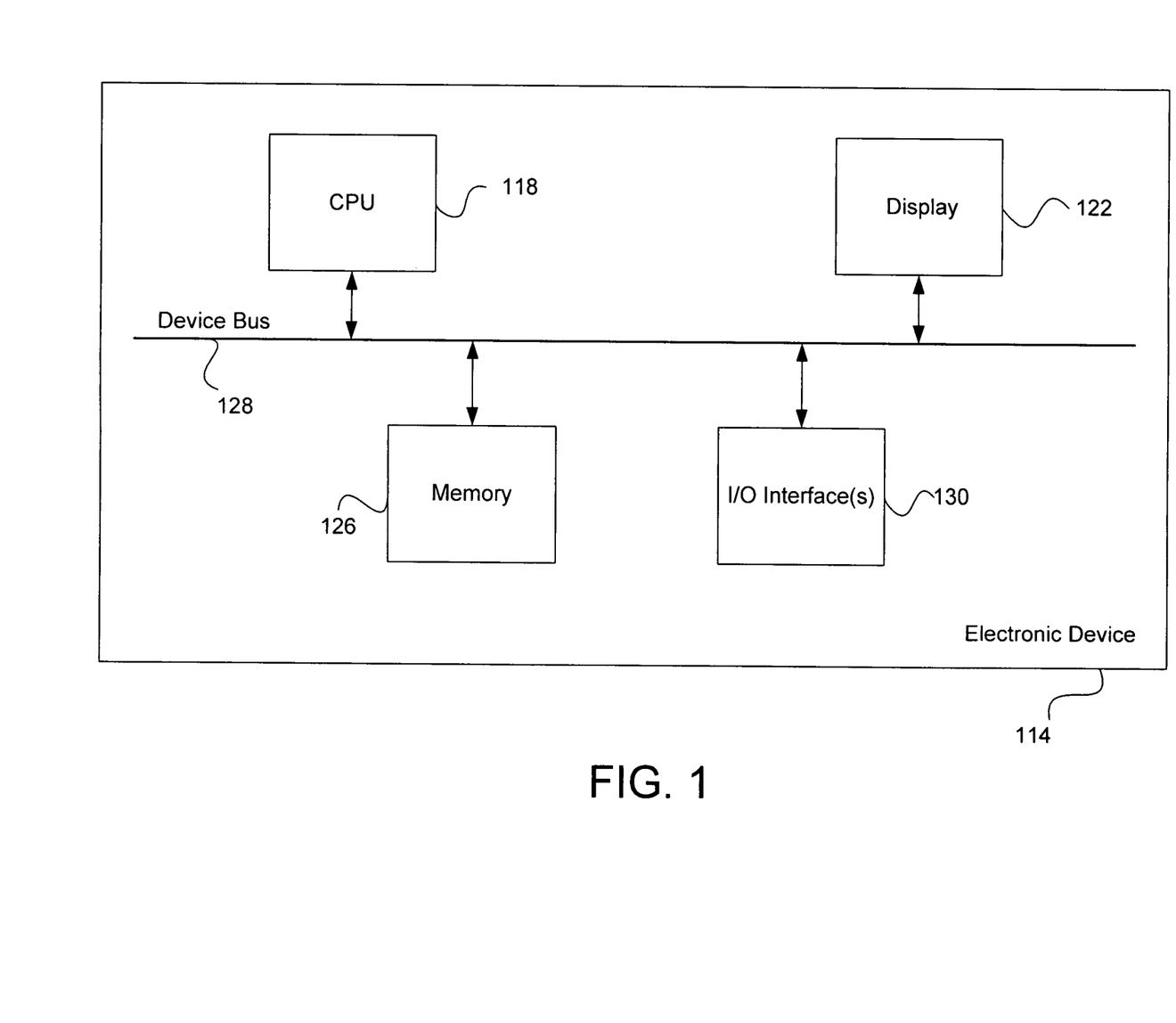
FIG. 1 is a block diagram of an electronic device, in accordance with one embodiment of the present invention.

Referring now to FIG. 1, a block diagram for one embodiment of an electronic device 114 is shown, in accordance with the present invention. In the FIG. 1 embodiment, electronic device 114 may include, but is not limited to, a central processing unit (CPU) 118, a display 122, a memory 126, and input/output interfaces (I/O interfaces) 130. Selected ones of the foregoing components of electronic device 114 may be coupled to, and communicate through, a device bus 128. In alternate embodiments, electronic device 114 may be implemented using components and configurations in addition to, or instead of, certain of those components and configurations discussed in conjunction with the FIG. 1 embodiment. In addition, electronic device 114 may alternately be implemented as any other desired type of electronic device or entity. For example, electronic device 114 may be implemented as a digital camera or a personal computer.

In the FIG. 1 embodiment, CPU 118 may be implemented to include any appropriate and compatible microprocessor device that executes software instructions to thereby control and manage the operation of electronic device 114. The FIG. 1 embodiment, display 122 may include any effective type of display technology including a cathode-ray-tube monitor or a liquid-crystal display device with an appropriate screen for displaying various information to a device user.

In the FIG. 1 embodiment, memory 126 may be implemented to include any combination of desired storage devices, including, but not limited to, read-only memory (ROM), random-access memory (RAM), and various types of non-volatile memory, such as floppy disks or hard disks. The contents and functionality of memory 126 are further discussed below in conjunction with FIG. 2. In the FIG. 1 embodiment, I/O interfaces 130 may include one or more input and/or output interfaces to receive and/or transmit any required types of information for electronic device 114. Additional details regarding the implementation and utilization of electronic device 114 are further discussed below in conjunction with FIGS. 2 through 8.

Figure 2:
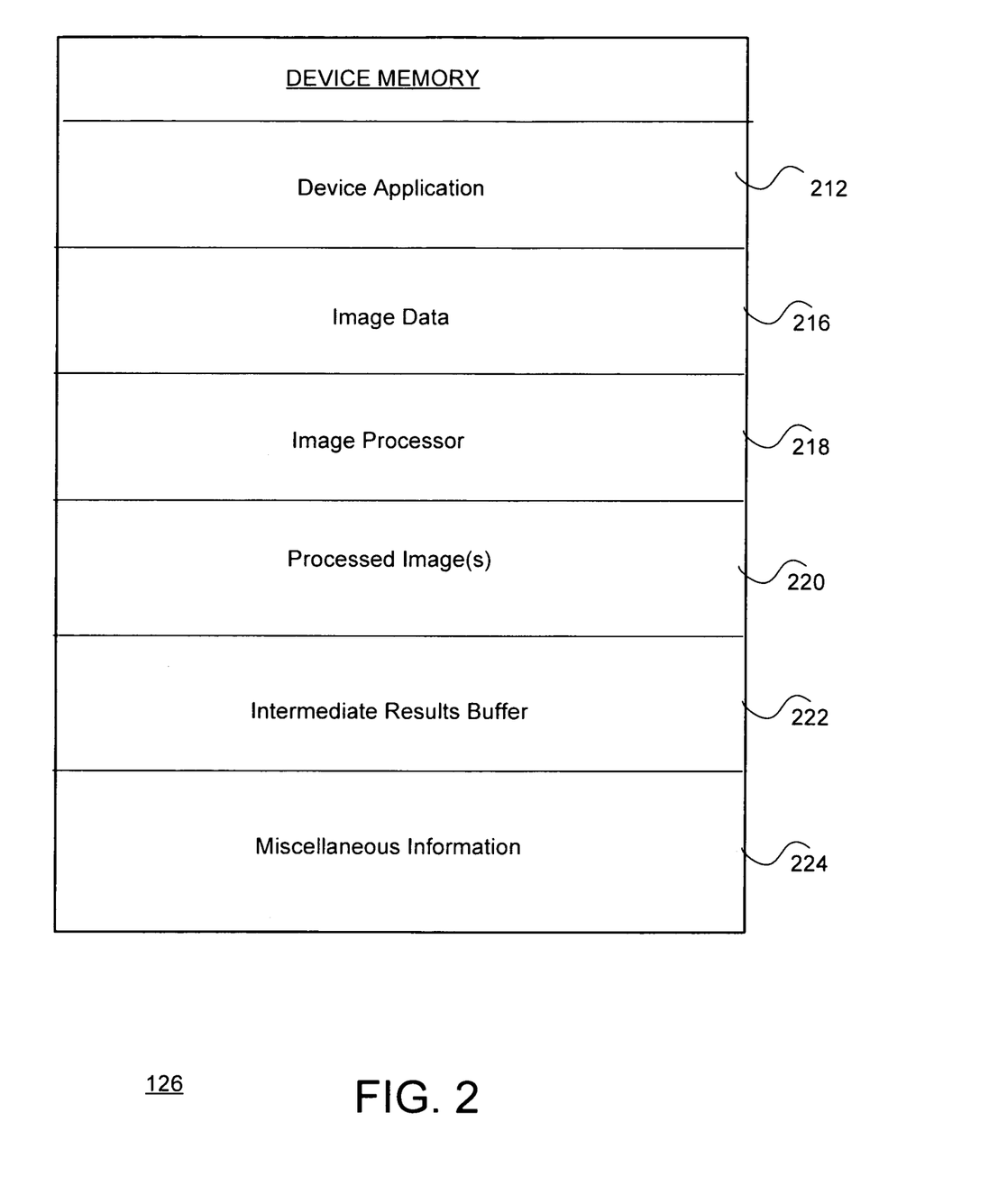
FIG. 2 is a block diagram for one embodiment of the device memory of FIG. 1, in accordance with the present invention.

Referring now to FIG. 2, a block diagram for one embodiment of the FIG. 1 memory 126 is shown, in accordance with the present invention. In the FIG. 2 embodiment, memory 126 includes, but is not limited to, a device application 212, image data 216, an image processor 218, an intermediate results buffer 222, processed image(s) 220, and miscellaneous information 224. In alternate embodiments, memory 126 may include components and functionalities in addition to, or instead of, certain of those components and functionalities discussed in conjunction with the FIG. 2 embodiment.

In the FIG. 2 embodiment, device application 212 may include program instructions that are preferably executed by CPU 118 (FIG. 1) to perform various functions and operations for electronic device 114. The particular nature and functionality of device application 212 typically varies depending upon factors such as the specific type and particular functionality of the corresponding electronic device 114. In the FIG. 2 embodiment, image processor 218 may utilize intermediate results buffer 222 for performing image processing tasks including, but not limited to, demosaicing, denoising and compression on image data 216 to produce processed image(s) 220 by utilizing any effective techniques or methods. In the FIG. 2 embodiment, miscellaneous information 224 may include any type of other data or software instructions for use by electronic device 114.

In the FIG. 2 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. Additional details regarding the implementation and utilization of image processor 218 are further discussed below in conjunction with FIGS. 3 through 8.

Figure 3:
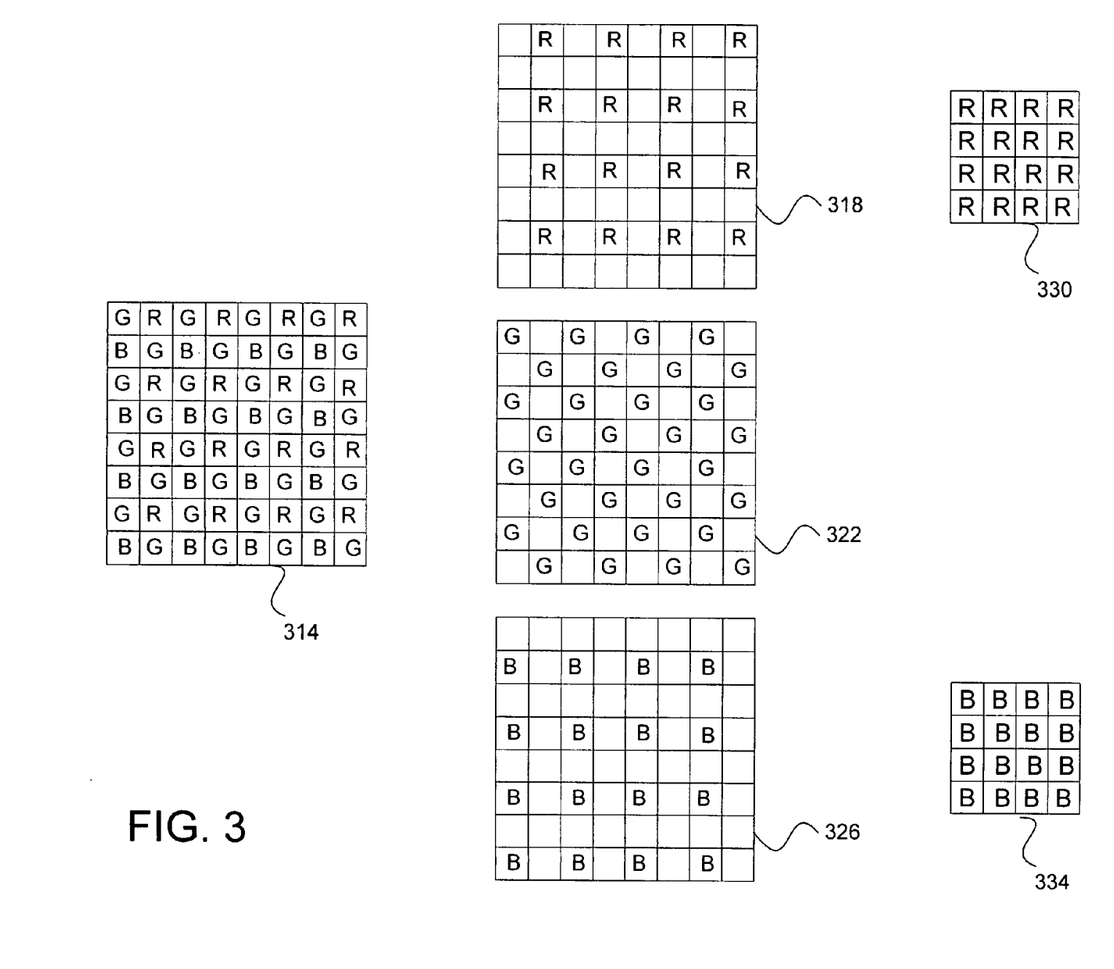
FIG. 3 is a diagram for illustrating the processing of a color pixel matrix, in accordance with one embodiment of the present invention.

Referring now to FIG. 3, a diagram for illustrating the processing of a color pixel matrix 314 is shown, in accordance with one embodiment of the present invention. The FIG. 3 embodiment is presented for purposes of illustration, and in alternate embodiments, image processing tasks may be performed using techniques in addition to, or instead of, certain of those techniques discussed in conjunction with the FIG. 3 embodiment.

In the FIG. 3 embodiment, pixel matrix 314 may be configured in accordance with a known or enhanced Bayer Pattern of interleaved red, blue, and green pixels. However, in alternate embodiments, any other appropriate configuration may be similarly be utilized. In addition, any other effective color encoding technique other than the red-blue-green color format shown in FIG. 3 may also be possible. In the FIG. 3 embodiment, pixel matrix 314 may correspond to some partition of image data 216. In addition, the size of pixel matrix 314 in FIG. 3 is chosen at 8×8 just for illustration purposes. Actual sizes of pixel matrix 314 in different image processing tasks can be different.

In the FIG. 3 embodiment, image processor 218 or other appropriate entity may separate pixel matrix 314 into a corresponding red matrix 318, green matrix 322, and blue matrix 326. The image processor may then perform a red subsampling procedure to produce a red quadrant 330 of contiguous red pixels. Similarly, the image processor may perform a blue subsampling procedure to produce a blue quadrant 334 of contiguous blue pixels. In accordance with the present invention, the image processor may also perform a green pixel processing procedure on green matrix 322. Additional details regarding the green-pixel processing procedure are further discussed below in conjunction with FIG. 4.

Figure 4:
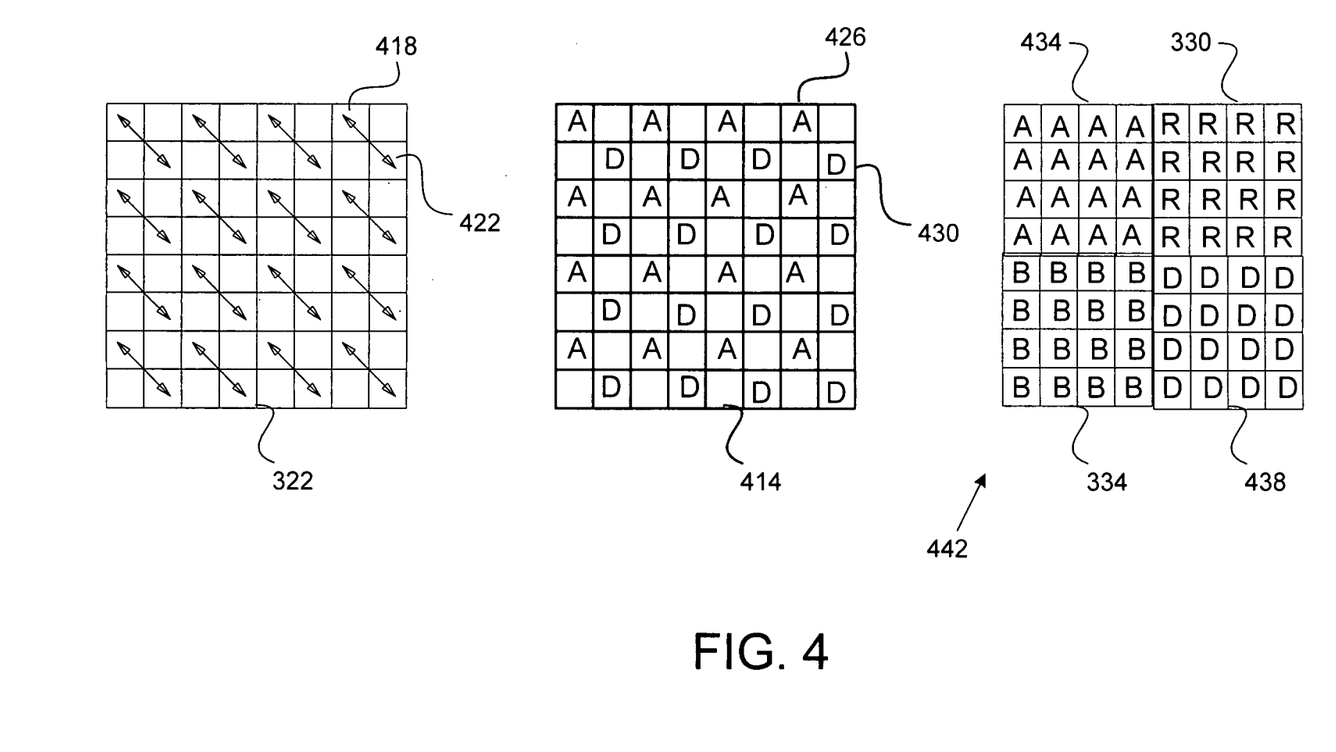
FIG. 4 is a diagram for illustrating the processing of green pixels from the green pixel matrix of FIG. 3, in accordance with one embodiment of the present invention.

Referring now to FIG. 4, a diagram for illustrating the processing of green pixels from a green pixel matrix 322 (FIG. 3) is shown, in accordance with one embodiment of the present invention. The FIG. 4 embodiment is presented for purposes of illustration, and in alternate embodiments, image processing tasks may be performed using techniques in addition to, or instead of, certain of those techniques discussed in conjunction with the FIG. 4 embodiment.

The FIG. 4 embodiment includes the green pixel matrix 322 shown above in FIG. 3 with pairs of adjacent diagonal green pixels that are each connected by a respective arrow. For example, a first green pixel $X_1$ (418) and a second green pixel $X_2$ (422) form one of the adjacent diagonal pairs.

In the FIG. 4 embodiment, image processor 218 or other appropriate entity may perform the green-pixel processing procedure by performing a 1-level wavelet transform procedure on each pair of adjacent diagonal green pixels to produce a corresponding averaged (A) term and difference (D) term. For example, image processor 218 may perform the 1-level wavelet transform procedure on pixel 418 and pixel 422 to produce corresponding A term 426 and D term 430. Similarly, image processor 218 may perform additional 1-level wavelet transforms on all other pairs of adjacent diagonal pixels in green-pixel matrix 322 to produce a transformed array 414 of the corresponding A terms and D terms.

In the FIG. 4 embodiment, an A term may be calculated according to the following formula:

$$A = \frac{X_1 + X_2}{\sqrt{2}}$$

where $X_1$ is a first adjacent diagonal pixel 418 and $X_2$ is a second adjacent diagonal pixel 422 from a given pixel pair.

Similarly, a D term may be calculated according to the following formula:

$$D = \frac{X_1 - X_2}{\sqrt{2}}$$

where $X_1$ is the first adjacent diagonal pixel 418 and $X_2$ is the second adjacent diagonal pixel 422 from a given pixel pair. In other embodiments, any other effective transform may similarly be utilized.

In the FIG. 4 embodiment, once transformed array 414 has been populated with A terms and D terms, then image processor 218 may perform an A sub-sampling procedure to create an A quadrant 434 of contiguous A terms, and may also perform a D sub-sampling procedure to produce a D quadrant 438 of contiguous D terms. In the FIG. 4 embodiment, image processor 218 may then position the R quadrant 330 and B quadrant 334 from FIG. 3 together with the A quadrant 434 and D quadrant 438 to form a segregated four-quadrant array 442 as shown in FIG. 4. Additional details regarding the utilization of four-quadrant arrays 442 in a wavelet thresholding scheme are further discussed below in conjunction with FIG. 5.

Figure 5A:
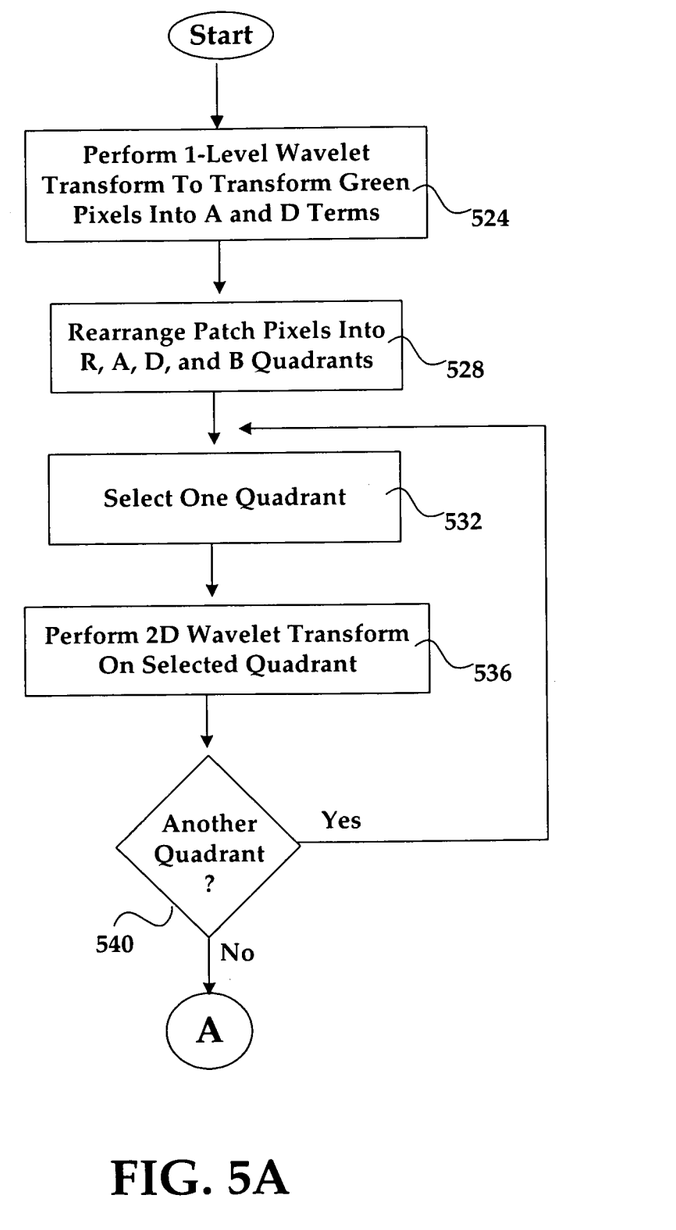
FIGS. 5A-5B are a flowchart of method steps for performing a wavelet thresholding procedure on a full-color matrix, in accordance with one embodiment of the present invention.
Figure 5B:
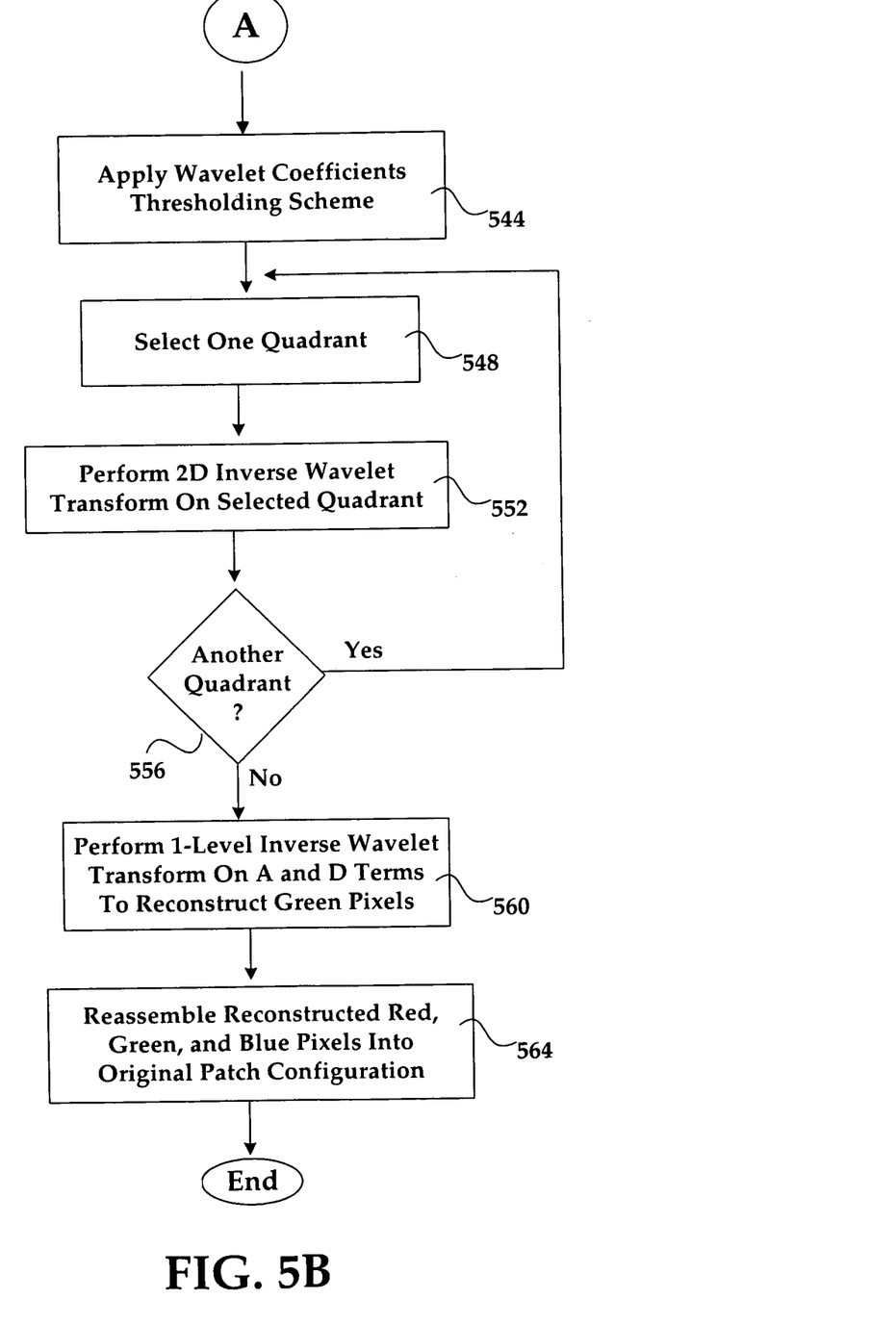

Referring now to FIGS. 5A-5B, a flowchart of method steps for performing wavelet thresholding on the full color pixel matrix 314 is shown, in accordance with one embodiment of the present invention. The FIG. 5 example is presented for purposes of illustration, and in alternate embodiments, the present invention may utilize steps and sequences in addition to, or instead of, certain of those steps and sequences discussed in conjunction with the FIG. 5 embodiment. Furthermore, the sequence of method steps disclosed below may best be understood with reference to certain elements discussed above in conjunction with FIGS. 3 and 4.

From step 524 to 540, an image processor 218 (FIG. 2) or other appropriate entity performs a 2D incomplete-data wavelet transform. In step 544, some wavelet coefficients thresholding schemes are applied. From step 548 to 564, the image processor performs a 2D incomplete-data inverse wavelet transform. More detailed descriptions of individual steps are as follows.

In step 524 of the FIG. 5 embodiment, image processor 218 begins a green-pixel transformation procedure by performing a 1-level wavelet transform procedure on adjacent diagonal pairs of green pixels from a green pixel matrix 422 derived from the full color pixel matrix 314, as discussed above in conjunction with FIGS. 3 and 4. The green pixel matrix 422 is thereby converted by the 1-level wavelet transform procedure into corresponding A terms and D terms of a transformed green array 414 (FIG. 4).

In step 528, image processor 218 rearranges the A terms into an A quadrant 434 of contiguous pixels, and similarly rearranges the D terms into a D quadrant 438 of contiguous pixels. Image processor 218 also rearranges the blue pixels 326 from the selected patch into a blue (B) quadrant 334 of contiguous pixels, and similarly rearranges the red pixels 318 from the selected patch into a red (R) quadrant 330 of contiguous pixels. Image processor 218 may then position the R quadrant 330, the B quadrant 334, the A quadrant 434, and the D quadrant 438 to form a four-quadrant array 442, as shown above in FIG. 4.

In step 532, image processor 218 selects one quadrant from the four-quadrant array 442. In step 536, the image processor performs some known or enhanced 2D wavelet transforms on the selected quadrant. In step 540, the image processor 218 determines whether any unprocessed quadrants remain in the four-quadrant array 422. If any unprocessed quadrants remain, then the FIG. 5 procedure returns to step 532 and selects and processes the additional quadrants, as described above.

Once all quadrants in the four-quadrant array 422 have been processed, then in step 544, image processor 218 or other appropriate entity may perform a wavelet coefficients thresholding schemes on each quadrant to effectively remove or suppress some undesired wavelet coefficients. For example, in certain embodiments, image processor 218 may perform the hard thresholding procedure by converting to zero or removing any of the wavelet coefficients that are within a predefined range of zero. In other words, the hard thresholding procedure removes the smallest wavelet coefficient values to thereby effectively remove the noise in denoising tasks, or reduce file size in compression tasks, or detect edges in demosaicing tasks. In alternate embodiments, soft-thresholding or other thresholding schemes are also possible. Additional information describing various techniques for performing wavelet transform and coefficient thresholding schemes may be found in "A Wavelet Tour Of Signal Processing" by S. Mallat, cited previously.

After wavelet coefficients thresholding, in step 548, image processor 218 then selects one quadrant from the four-quadrant array 422. In step 552, the image processor performs the 2D inverse wavelet transforms corresponding to step 536 on the selected quadrant. In step 556, the image processor determines whether any quadrants remain to be unprocessed. If any unprocessed quadrants remain, then the FIG. 5 procedure returns to step 548 and selects and processes the additional quadrants, as described above.

In step 560, image processor 218 may then perform an inverse 1-level wavelet transform on the A terms and D terms in the A quadrant 434 and the D quadrant 438 of the four-quadrant array 422 to produce reconstructed green pixels corresponding to the original green pixel matrix 322 (FIG. 3). Finally, in step 564, image processor 218 reassembles the reconstructed red, green, and blue pixels into the interleaved configurations of the original patch 314. In certain embodiments, image processor 218 may utilize the FIG. 5 procedure to process the two green quadrants (A and D) while utilizing other different methods to process the red and blue quadrants. For further de-correlation of images, many similar image patches may be put in a 3D array. Additional details regarding the joint wavelet thresholding procedure of the 3D array are discussed below in conjunction with FIGS. 6 and 7.

Figure 6:
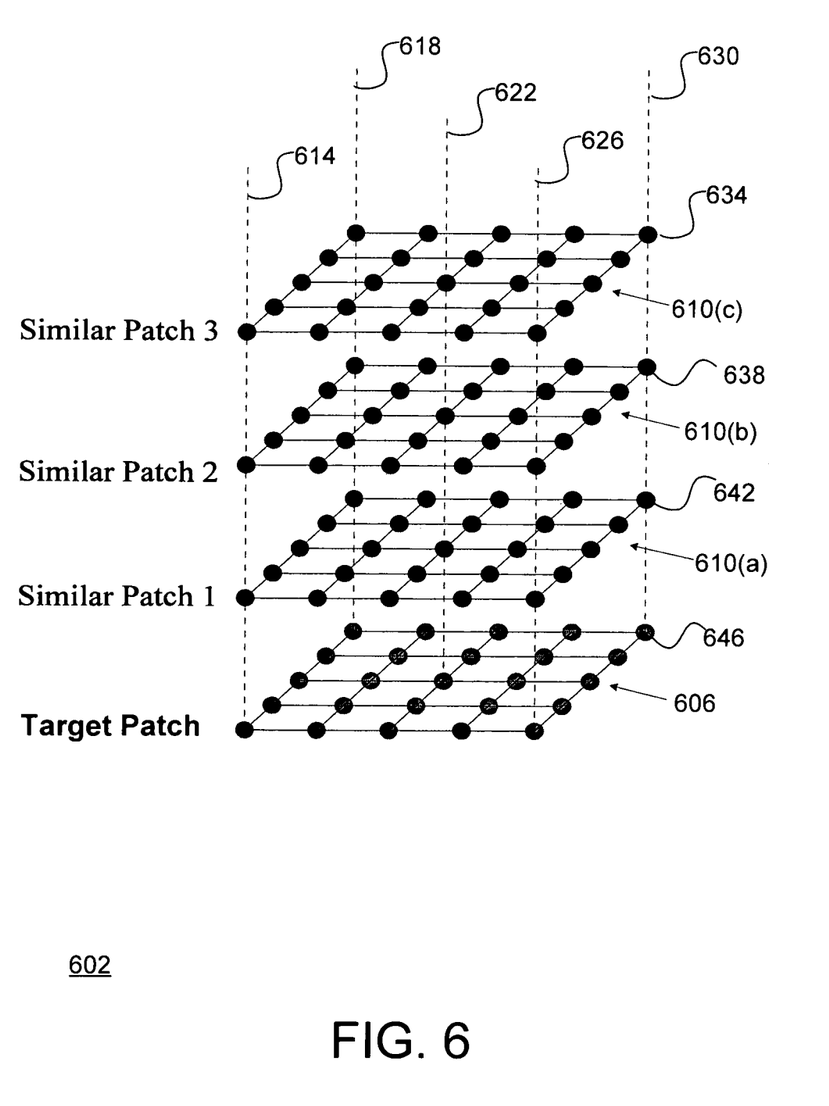
FIG. 6 is a diagram of a 3D array, in accordance with one embodiment of the present invention.

Referring now to FIG. 6, a diagram of a 3D array 602 is shown, in accordance with one embodiment of the present invention. The FIG. 6 example is presented for purposes of illustration, and in alternate embodiments, intermediate result values may be calculated using techniques in addition to, or instead of, certain of those techniques discussed in conjunction with the FIG. 6 embodiment.

In the FIG. 6 embodiment, image processor 218 (FIG. 2) or other appropriate entity may try to further de-correlate image signals. First, a target patch 606 for image processing is selected and put on the bottom layer of the 3D array 602. Then a search procedure of similar patches is applied to the target patch 606 and the most similar patches (610(a)), (610(b)), and (610(c)) are also put in the 3D array 602. The details about how to perform search procedure for similar patches may be application dependent. One possible search procedure is described in "An improved method to measure local image similarity and its application in image processing", cited previously. In alternative embodiments, other appropriate procedures for searching similar patches may also be used. Furthermore, 3D array 602 may include any appropriate number of similar patches 610. However in certain embodiments, image processor 218 limits the similar patches 610 to a predefined number of most-similar patches 610.

Figure 7A:
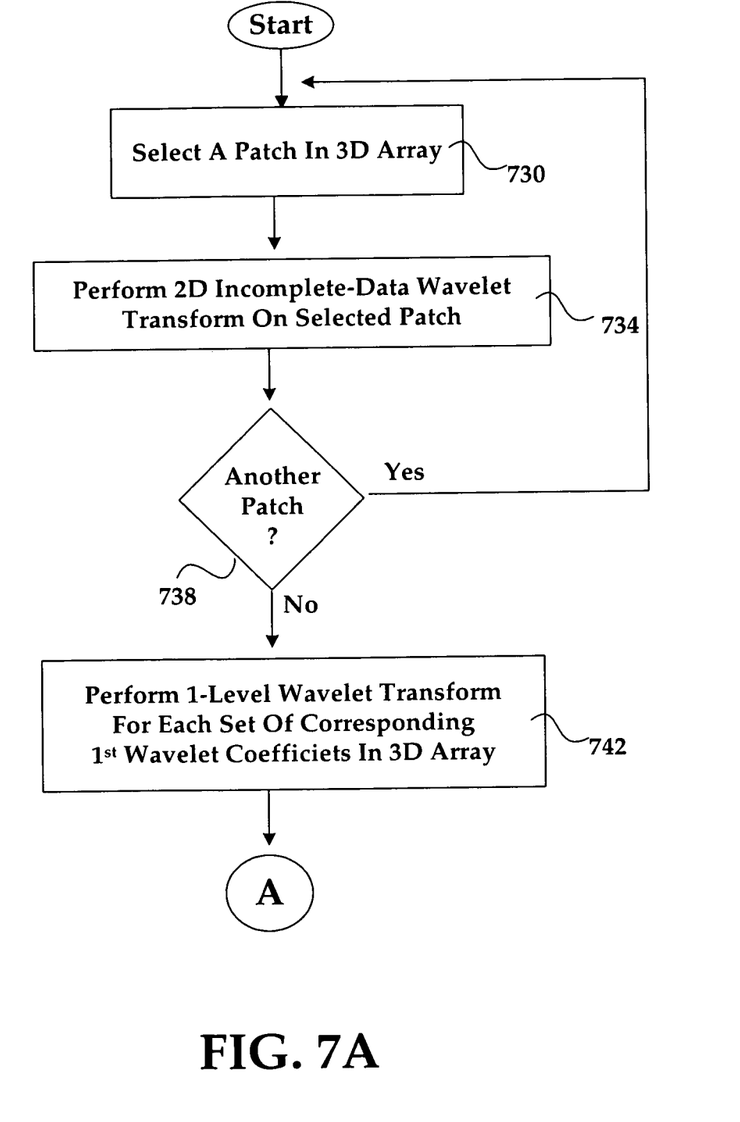
FIGS. 7A-7B are a flowchart of method steps for performing a wavelet thresholding procedure on a 3-D array, in accordance with one embodiment of the present invention.
Figure 7B:
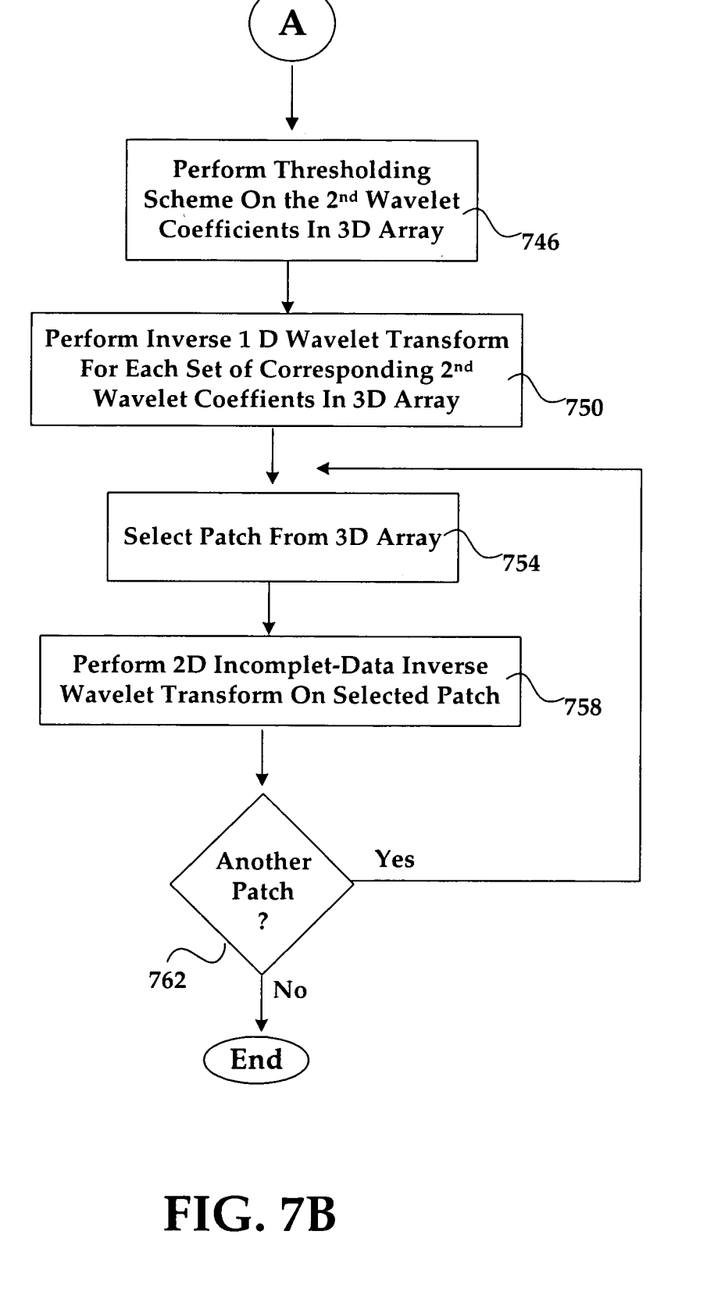

In accordance with the present invention, each of the similar patches 610 have pixels that correspond to respective pixels of target patch 606 because these corresponding pixels have the same relative position in their individual patches. In the FIG. 6 embodiment, this correspondence is illustrated with a vertical axis that passes through exemplary sets of corresponding pixels. For example, a set of corresponding top right pixels 634, 638, 642, and 646 is linked by axis 630, Similarly, axis 614 links a set of corresponding bottom left pixels, axis 618 links a set of corresponding top left pixels, axis 626 links a set of corresponding bottom right pixels, and axis 622 links a set of corresponding center pixels. The remaining pixels of the 3D array 602 also have similar corresponding relationships. In the FIG. 6 embodiment, image processor 218 may perform incomplete-data wavelet thresholding on the 3D array 602. For example, one exemplary technique for performing incomplete-data wavelet thresholding is discussed below in conjunction with FIG. 7.

Referring now to FIGS. 7A-7B, a flowchart of method steps for performing a wavelet thresholding procedure on a 3D array is shown, in accordance with one embodiment of the present invention. The FIG. 7 example is presented for purposes of illustration, and in alternate embodiments, the present invention may utilize steps and sequences in addition to, or instead of, certain of those steps and sequences discussed in conjunction with the FIG. 7 embodiment. Furthermore, the sequence of method steps disclosed below may best be understood with reference to certain elements discussed above in conjunction with FIGS. 5 and 6.

In step 730 of the FIG. 7 embodiment, an image processor 218 (FIG. 2) or other appropriate entity initially selects a current patch from a 3D array 602, as discussed above in conjunction with FIG. 6. In step 734, image processor 218 then performs a 2D incomplete-data wavelet transform, as discussed in conjunction with step 524 to 540 in FIG. 5, on the selected patch to produce corresponding first wavelet coefficients in a transform domain. In step 738, the image processor determines whether any patches in the 3D array 602 remain unprocessed. If any unprocessed patches remain, then the FIG. 7 procedure returns to step 730 and selects and processes the additional patches, as described above.

In certain embodiments, the first wavelet coefficients are of the same size as the original patch, and therefore may be stored in the same 3D array by replacing the original pixels values. In certain embodiments, to more effectively de-correlate the pixel information contained in the 3D array 602, an image processor 218 may utilize a known or enhanced one dimensional (1D) wavelet transform on each set of corresponding first wavelet coefficients in the foregoing step 742. In the FIG. 7 embodiment, these corresponding coefficients are defined as having the same relative position within the different patches in the 3D array 602.

As discussed above in conjunction with FIG. 6, each of the similar patches 610 has corresponding pixels with the same relative position in their individual patches. In the FIG. 6 embodiment, this correspondence is illustrated with a vertical axis that passes through exemplary sets of corresponding pixels. For example, a set of corresponding top right first wavelet coefficients 634, 638, 642, and 646 is linked by axis 630. Similarly, axis 614 links a set of corresponding bottom left first wavelet coefficients, axis 618 links a set of corresponding top left first wavelet coefficients, axis 626 links a set of corresponding bottom right first wavelet coefficients, and axis 622 links a set of corresponding center first wavelet coefficients. The remaining first wavelet coefficients of the 3D array 602 also have similar corresponding relationships.

In the FIG. 7 embodiment, image processor 218 therefore performs a separate known or enhanced 1D wavelet transform on each set of corresponding first wavelet coefficients in the 3D array 602 to produce respective second wavelet coefficients. In certain embodiments, the obtained second wavelet coefficients are of the same length as the sets of corresponding first wavelet coefficients, and therefore may be stored in the same 3D array by replacing the first wavelet coefficients.

In step 746, image processor 218 may then perform a known or enhanced thresholding scheme on all second wavelet coefficients in the 3D array 602 according to any effective techniques or methodologies such as hard-thresholding, soft-thresholding, etc. In step 750, image processor 218 may then perform an inverse 1D wavelet transform procedure to reverse the effect of the foregoing 1D wavelet transform of step 742. Similarly, in step 754 to 762, image processor 218 may perform a 2D incomplete-data inverse wavelet transform procedure, described in step 548 to 564 in FIG. 5, on each individual patch in the 3D array 602 to reverse the effect of the foregoing 2D incomplete-data wavelet transform of step 730 to 738. If the 2D incomplete-data inverse wavelet transform has been applied to all patches in the 3D array 602, then the FIG. 7 procedure may terminate.

Figure 8A:
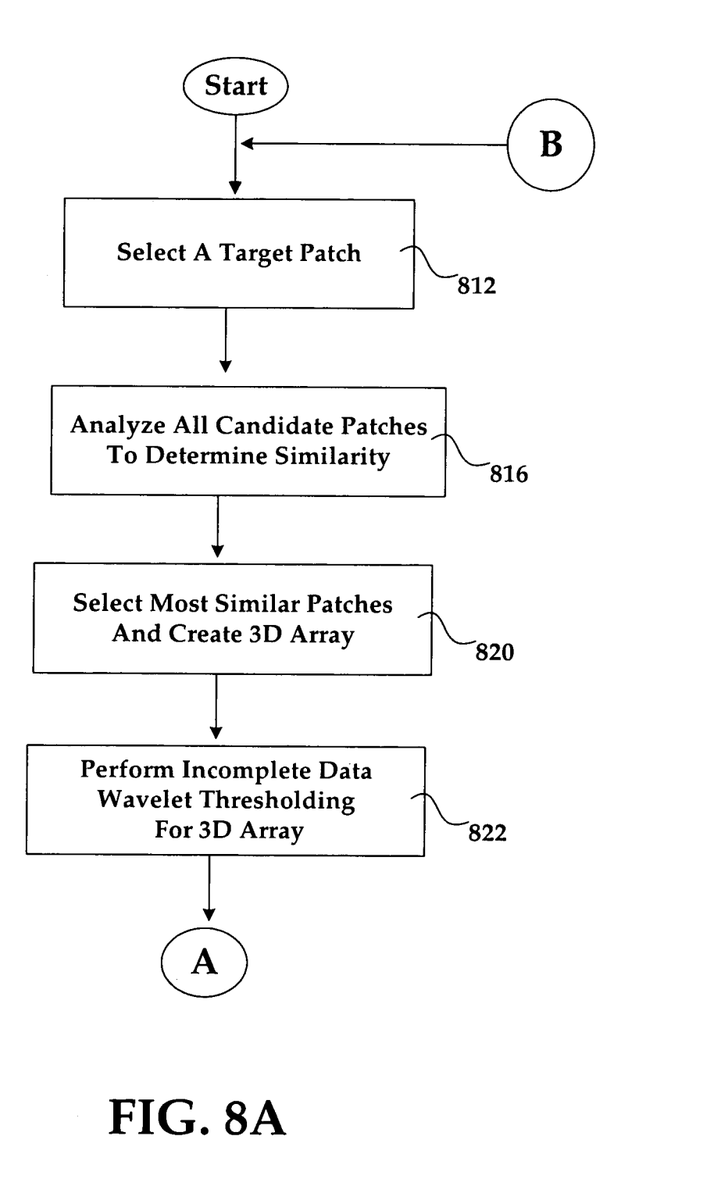
FIGS. 8A-8B are a flowchart of method steps for applying an incomplete-data wavelet thresholding scheme, in accordance with one embodiment of the present invention.
Figure 8B:
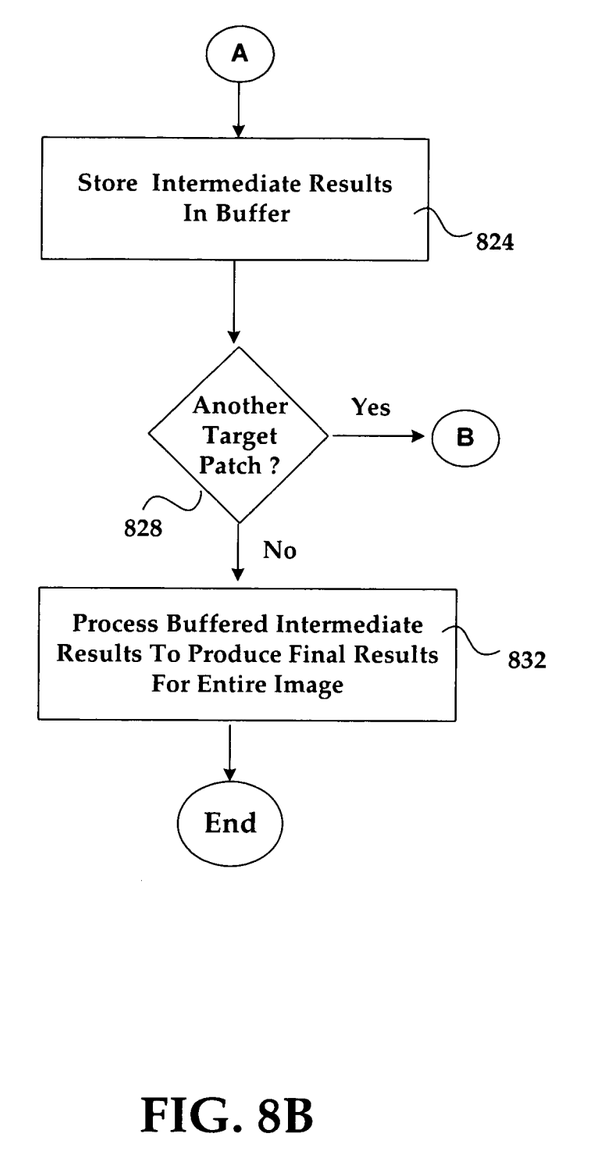

In certain embodiments of present invention, in order to achieve better image processing performance, the above described incomplete-data wavelet thresholding scheme may be adopted in an improved local image similarity framework described in "An improved method to measure local image similarity and its application in image processing", previously cited. Better image processing performance, for example, may refer to cleaner image in denoising, less artifacts in demosaicing, and smaller file size for the similar image quality in compression. Additional details regarding to adopt incomplete-data wavelet thresholding schemes in the improved local image similarity framework are discussed below in conjunction with FIG. 8.

Referring now to FIGS. 8A-8B, a flowchart of method steps for applying the previously described incomplete-data wavelet thresholding scheme in the improved local image similarity measurement framework is shown, in accordance with one embodiment of the present invention. The FIG. 8 example is presented for purposes of illustration, and in alternate embodiments, the present invention may utilize steps and sequences in addition to, or instead of, certain of those steps and sequences discussed in conjunction with the FIG. 8 embodiment.

In step 812 of the FIG. 8 embodiment, an image processor 218 (FIG. 2) or other appropriate entity initially selects a target patch 506 in image data 216. In step 816, the image processor 218 may then analyze the similarity of nearby image patches with respect to the target patch 606 to thereby determine which nearby patches may be classified as similar patches. One possible procedure to analyze the similarity of the target patch 606 and its nearby patches are described in "An improved method to measure local image similarity and its application in image processing", cited previously. In alternate embodiments, other procedures to analyze the similarity of the target patch 606 and its nearby patches may also be used.

In step 820 of the FIG. 8 embodiment, image processor 218 then selects a predefined number of the similar patches 610 that are most similar to the target patch 606 to define a 3D pixel array 602 created from the set of most-similar similar patches and the target patch. In step 822, the image processor then utilizes the 3D array 602 to perform the incomplete-data wavelet thresholding described in FIGS. 6 and 7 during which the image processor produces a set of intermediate results for the entire 3D array 602.

In step 824, image processor 218 stores the foregoing set of intermediate results for the entire current target patch 606 into an intermediate results buffer 222. More details about applying a rotating memory storage technique for economical utilization of the intermediate results buffer 222 are discussed in "An improved method to measure local image similarity and its application in image processing", cited previously. In step 828, the image processor 218 determines whether any unprocessed target patches 606 remain for performing the foregoing wavelet thresholding procedure. If additional target patches 606 remain, then the FIG. 8 process loops back to step 812, moves to a new current target patch 606, and derives a new set of intermediate results in a similar manner for storage in the intermediate results buffer 222.

Finally, in step 832, image processor 218 may perform an intermediate-results combination procedure that separately takes medians, averages, or other appropriate statistics of the buffered intermediate results for each of the respective pixel locations to produce corresponding processed image pixels 220 for the entire image 216. The FIG. 8 process may then terminate. For all of the foregoing reasons, the present invention thus provides an improved system and method for effectively performing an enhanced image processing procedures including, but not limited to, denoising.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an enhanced image processing procedure with an electronic device, comprising:
    an image processor that performs a 2D incomplete-data wavelet transform and thresholding procedure, said 2D incomplete-data wavelet transform being performed on each patch of a 3D array consisting of similar patches, said thresholding procedure being applied to the wavelet coefficients of said 3D array, said image processor building said 3D array for a selected target patch, said image processor performing said incomplete-data wavelet transform and thresholding procedure upon said 3D array to produce an intermediate result, said image processor combining the intermediate results of multiple 3D-arrays to produce final results; and
    a central processing unit that controls said image processor to perform said 2D incomplete-data wavelet transform and thresholding procedure upon image data.

2. The system of claim 1 wherein said image data is initially configured according to a Bayer Pattern format of interleaved red pixels, green pixels, and blue pixels.

3. The system of claim 2 wherein said image processor initially separates said image data into a red matrix of said red pixels, a green matrix of said green pixels, and a blue matrix of said blue pixels.

4. The system of claim 3 wherein said image processor subsamples said red matrix to produce a red quadrant of said red pixels, said image processor also subsampling said blue matrix to produce a blue quadrant of said blue pixels.

5. The system of claim 4 wherein said image processor performs said green-pixel transformation procedure on adjacent diagonal pairs of said green pixels from said green matrix.

6. The system of claim 5 wherein said green-pixel transformation procedure includes a 1-level wavelet transform that converts said adjacent diagonal pairs of green pixels into corresponding A terms and D terms in a transformed green matrix.

7. The system of claim 6 wherein said image processor subsamples said transformed green matrix to produce an A quadrant of said A terms and a D quadrant of said D terms.

8. The system of claim 7 wherein said image processor positions said red quadrant, said A quadrant, said D quadrant, and said blue quadrant to produce a four-quadrant array.

9. The system of claim 8 wherein said image processor performs a 2D wavelet transform on each quadrant in said four-quadrant array to produce wavelet coefficients.

10. The system of claim 9 wherein said image processor performs a wavelet coefficients thresholding procedure upon said wavelet coefficients of said four-quadrant array to produce thresholded coefficients.

11. The system of claim 10 wherein said image processor performs an inverse 2D wavelet transform on said thresholded coefficients to produce four reconstructed quadrants for said four-quadrant array.

12. The system of claim 11 wherein said image processor performs an inverse 1-level wavelet transform upon a reconstructed A quadrant and a reconstructed D quadrant from said reconstructed four-quadrant array to produce reconstructed green pixels.

13. The system of claim 12 wherein said image processor rearranges a reconstructed R quadrant, a reconstructed B quadrant, and said green pixels into said Bayer Pattern format to populate a final processed version of said four-quadrant array.

14. The system of claim 1 wherein said image processor selects a target patch and builds a 3D array of said target patch and one or more similar patches of said target patch.

15. The system of claim 14 wherein said image processor performs a 2D incomplete-data wavelet transform on each patch in said 3D array to produce first wavelet coefficients, said image processor then performing a 1D wavelet transform on each set of corresponding first coefficients in a third dimension to produce second wavelet coefficients.

16. The system of claim 15 wherein said image processor performs a wavelet coefficients thresholding procedure upon said second coefficients to produce thresholded coefficients.

17. The system of claim 16 wherein said image processor performs an inverse 1D wavelet transform on corresponding sets of said thresholded coefficients to produce first reconstructed coefficients, said image processor then performing an inverse transform of said 2D incomplete-data wavelet transform on said first reconstructed coefficients to produce a reconstructed 3D array.

18. The system of claim 17 wherein said final reconstructed 3D array provides an intermediate result values for storing into an intermediate results buffer.

19. The system of claim 18 wherein said image processor combines said intermediate results of multiple 3D arrays to produce better final results of image processing tasks including denoising.

20. A method for performing an enhanced image processing procedure with an electronic device, comprising the steps of:

performing an incomplete-data wavelet transform and thresholding procedure upon a 3D array consisting of a target patch and one or more similar patches, reconstructed values of said 3D array being saved as intermediate results in an intermediate result buffer;

performing an intermediate-results combination procedure with an image processor by combining said intermediate result values to produce processed pixel values; and utilizing a processor controller device to control said image processor for performing said incomplete-data wavelet transform and thresholding procedure.

\* \* \* \* \*